United States Patent [19]

Lachmann et al.

[11] Patent Number: 5,672,823
[45] Date of Patent: Sep. 30, 1997

[54] FRONT-REMOVABLE GAUGE

[75] Inventors: Leonard P. Lachmann; Thomas Lozito; David Williams, all of El Paso, Tex.

[73] Assignee: Joseph Pollak Corporation, Boston, Mass.

[21] Appl. No.: 630,757

[22] Filed: Apr. 10, 1996

[51] Int. Cl.⁶ .................................................. G01D 11/24
[52] U.S. Cl. ............................ 73/431; 324/156; 361/659
[58] Field of Search ............................ 73/431, 866.3; 324/156; 361/659, 660, 661, 662, 663, 664, 665, 666, 667, 668, 669, 670, 671, 672

[56] References Cited

U.S. PATENT DOCUMENTS

| | | | |
|---|---|---|---|
| 1,599,107 | 9/1926 | Whitson | 73/431 |
| 1,750,601 | 3/1930 | Keeney | 73/431 |
| 1,761,953 | 6/1930 | Zubaty | 73/431 |
| 2,061,761 | 11/1936 | Gaiser | 73/431 |
| 2,463,844 | 3/1949 | Anderson | 73/431 |
| 2,575,715 | 11/1951 | Keller | 73/431 |
| 2,712,113 | 6/1955 | Triplett | 73/431 |
| 3,161,032 | 12/1964 | Huston | 73/431 |
| 3,278,144 | 10/1966 | Dixson et al. | 73/431 |
| 3,441,352 | 4/1969 | Hughes | 356/189 |
| 3,570,108 | 3/1971 | Sarra | 73/431 X |
| 3,648,166 | 3/1972 | Redecker et al. | 324/156 X |
| 3,793,563 | 2/1974 | Brefka | 324/156 X |
| 3,807,236 | 4/1974 | Leone | 73/431 |
| 3,962,610 | 6/1976 | Reed et al. | 361/661 X |
| 4,033,191 | 7/1977 | Kreuz et al. | 73/431 |
| 4,075,561 | 2/1978 | Stevens | 324/156 X |
| 4,110,814 | 8/1978 | Britton et al. | 361/668 X |
| 4,297,635 | 10/1981 | Stevens | 324/156 X |
| 4,807,472 | 2/1989 | Brown et al. | 73/431 X |
| 5,140,259 | 8/1992 | Aida | 324/156 |
| 5,396,796 | 3/1995 | Kotani et al. | 73/431 |
| 5,554,809 | 9/1996 | Tobita et al. | 73/700 |

*Primary Examiner*—Richard Chilcot
*Assistant Examiner*—Paul D. Amrozowicz
*Attorney, Agent, or Firm*—Kenway & Crowley

[57] ABSTRACT

A front removable gauge assembly including a case gauge housing for locking the assembly to an instrument panel. A printed circuit board is mounted within the case gauge housing in electrical contact with conductors of a connector shell which extends from the case gauge housing for electrically connecting elements on the printed circuit board to an instrument signal source. A front removable gauge unit is removably mounted within the case gauge housing and contains an instrument assembly which can be mounted for 90-degree or 255-degree pointer sweep. From the bottom of the front removable gauge unit, a connector stud and wiper contacts extend. The connector stud has a protruding key which engages the bottom surface of the printed circuit board upon clockwise rotation of the front removable gauge unit to thereby removably lock it to the printed circuit boards. Also, with rotation, the wiper contacts are pressed against contact pads on the printed circuit board from which they remove oxidation and improve electrical contact. For removal, the front removable gauge unit is simply rotated in a counterclockwise direction to disengage the key from the printed circuit board.

4 Claims, 4 Drawing Sheets

FRONT-REMOVABLE GAUGE

FIELD OF THE INVENTION

The present invention relates in general to a front-removable gauge assembly and, more particularly, to a front-removable gauge assembly which allows for simple and facile connection of an instrument gauge to a stand-alone casing or to an instrument cluster in, for example, an automotive dash panel.

BACKGROUND OF THE INVENTION

In current instrument gauge panels, and particularly in automotive dash panels, it is difficult to remove gauges for repair or replacement. Also, the desired flexibility of being able to place any gauge in any location on the panel is lacking. Instead, gauge location is typically customized such that special tools are required for installing and removing gauges from specific locations on the panel. In sum, installation and removal or shifting of gauge assemblies is time-consuming, labor intensive, and inefficient.

The need for a system in which gauge assemblies may be simply and quickly removed from a panel and replaced has been recognized. For several years, efforts have been made to provide removable gauge assemblies in non-automotive applications. Examples of such assemblies are shown in U.S. Pat. Nos. 3,441,352 and 3,807,236.

In U.S. Pat. No. 3,441,352 to L. A. Hughes, an interchangeable meter design is disclosed which allows for selection and rapid interchangeability of various colorimeters in a main instrument panel. Each of the separate colorimeters includes banana plugs which are installed into sockets to make suitable electrical connections. Cylindrical receptacles are disposed in openings in the top plate of an instrument housing, and a colorimeter can be placed in a receptacle and connected electrically via the banana plugs.

Although this design is suitable for its intended purpose of providing physicians with a flexible tool for performing diagnostic testing, it is limited to use in this particular application and is not adapted to automotive applications. For example, no mechanism is provided by which a meter may be easily connected to typical electronically or mechanically driven instrument panels which are in current use in automotive applications. In addition, no accommodation can easily be made for the traditional air-core meter movement which is in widespread use in modern instrument gauges.

Likewise, the clock mounting mechanism of U.S. Pat. No. 3,807,236 to Leone does not provide the flexibility of connection required in automotive applications. In fact, this assembly is designed for a stand-alone device (e.g., a clock), and, therefore, it includes no means by which an instrument may be connected to external components to provide an indication of system parameters such as engine temperature, oil pressure, fuel level etc. Moreover, the mounting assembly of Leone makes no provision for mounting conventional air-core meter designs in an instrument panel as either a stand-alone gauge or as part of an instrument cluster.

Thus, the need exists for front-removable technology to make gauges accessible from the front of a dash panel without having to remove the dash panel or resort to special tools. As a further consideration, there is a need in the art for a front removable gauge assembly which can easily accommodate air-core meter movement designs commonly used in automotive applications. Finally, an assembly which can accommodate mechanical gauge movements such as a Bourdon tube mechanism would be advantageous from the standpoint of flexibility in automotive applications.

OBJECTS OF THE INVENTION

It is a primary object of the present invention to provide a front-removable gauge assembly which allows for easy and relatively labor-free installation and removal of an instrument gauge in an automotive instrument panel.

Another object of the present invention is to provide a front removable gauge assembly which may be connected in an instrument panel as either a stand-alone instrument, or as a unit of an instrument cluster.

Yet another object of the present invention is to provide a front removable gauge assembly which can accommodate conventional air-core meter movements as well as mechanical movements.

These and other objects, features, and advantages of the present invention will become apparent from a review of the description which follows.

SUMMARY OF THE INVENTION

The present invention is concerned with front-removable gauge (FRG) technology which utilizes a generally cylindrical open-topped case gauge housing having an internally mounted printed circuit board and a molded-in connector shell having conductor blades in electrical contact with electrical elements on the printed circuit board. The connector shell extends from the bottom of the case gauge housing and the conductor blades serve to electrically connect the printed circuit board to an external instrument signal source. A cylindrical FRG unit is removably mounted on the printed circuit board within the case gauge housing and contains an instrument assembly. Spring wiper contacts on the bottom of the FRG unit electrically connect the instrument assembly to the printed circuit board.

A connector stud having an end key extends from the bottom of the FRG unit and passes through a central keyway opening in the circuit board. A shoulder on the key engages the underside of the printed circuit board upon clockwise rotation of the FRG unit thereby to removably lock the unit to the printed-circuit board. For removal, the FRG unit is simply rotated in a counterclockwise direction to remove the shoulder from beneath the printed circuit board to the keyway. The FRG unit with the instrument assembly fixed therein may then be easily lifted out of the case gauge housing for service or replacement.

The case gauge housing is accommodates either electrical or mechanical gauge movements. In addition, the case gauge housing may be fixed to an instrument panel without the use of a bracket. A locking rim and tabs axially spaced from the rim extend radially from the exterior surface of the case gauge housing adjacent the top open end. When the case gage housing is inserted in a panel opening, its walls are adapted to flex inwardly, permitting the capture of the instrument panel between the locking rim and the locking tabs.

BRIEF DESCRIPTION OF THE DRAWING

A preferred embodiment of the invention is described below with reference to the following figures wherein like numerals represent like parts.

DETAILED DESCRIPTION OF THE INVENTION

Figure 1:
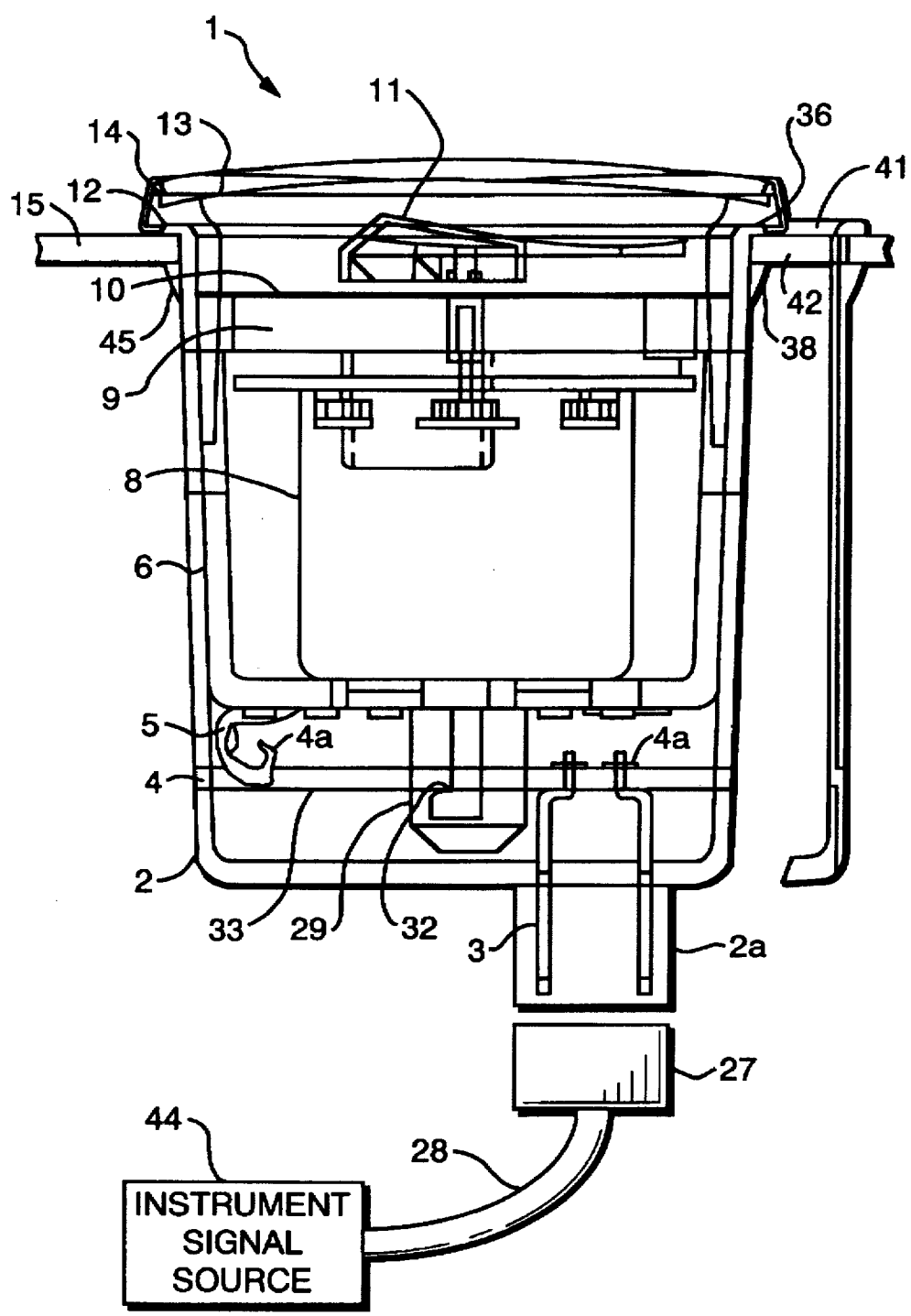
FIG. 1 is a sectional view of a preferred embodiment of a front-removable gauge assembly according to the present invention.
Figure 2:
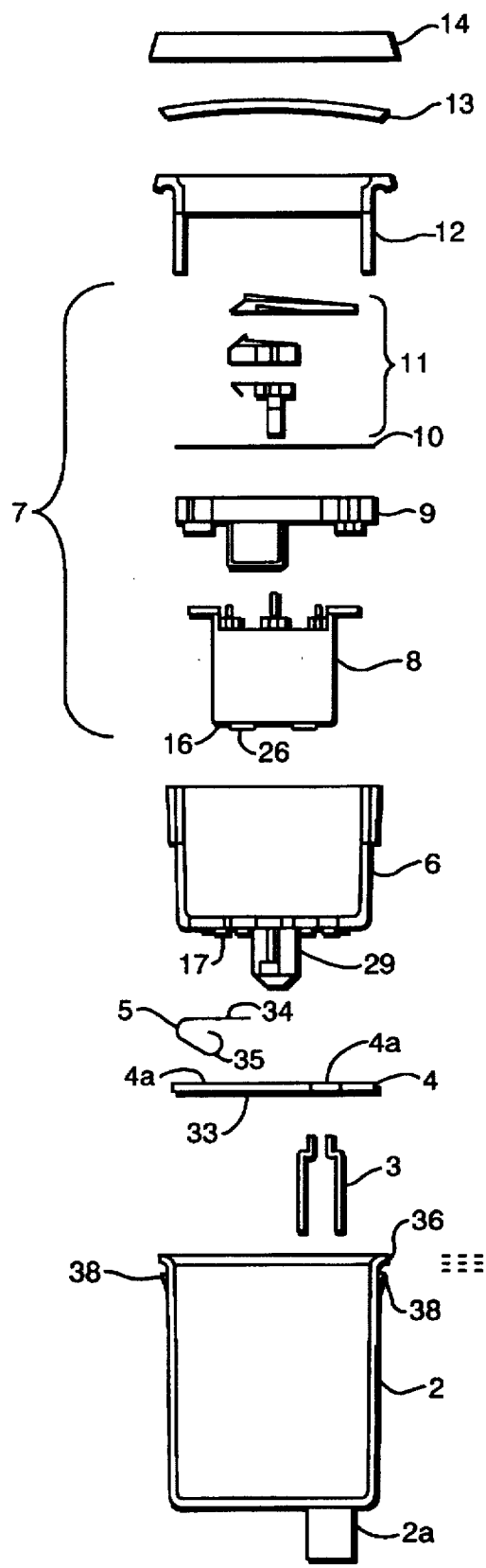
FIG. 2 is a sectional exploded view of a of the front-removable gauge assembly of FIG. 1.

Referring now to FIGS. 1 and 2, there is shown, in sectional and exploded views, an embodiment of a front-removable gauge (FRG) assembly i according to the present invention. This embodiment is shown and described in connection with electrically driven instrument systems. However, other embodiments of the invention, particularly involving variations of the case gauge housing, are equally useful in connection with mechanically driven instrument systems.

As shown particularly in FIG. 2, the case gauge housing includes a cylindrical plastic receptacle 2 having a molded-in plastic extension 2a through which electrically conductive blades 3 pass. A printed circuit board 4 is mounted in the receptacle 2 and has contact pads as at 4a to which the blades 3 are soldered. A plastic FRG unit 6 contains an instrument assembly 7, an inner bezel 12, a lens 13, and an outer bezel 14 which may be mounted in an instrument panel 15. The instrument assembly includes known elements such as an air-core meter movement 8, a lite pipe 9 for directing light from a bulb to the face of the gauge, an instrument overlay 10, and a pointer assembly 11.

The elements of the instrument assembly are permanently joined together and fixed in the FRG unit 6 to become the primary structure for mounting the gauges in either the case gauge housing or in an instrument cluster.

Connection of the instrument assembly to the FRG unit requires a modification of the conventional air-core meter movement 8. Specifically, the bottom side 16 of the air-core 8 is modified to be mounted in the molded plastic FRG unit 6 which is shown in greater detail in FIG. 3.

Figure 3:
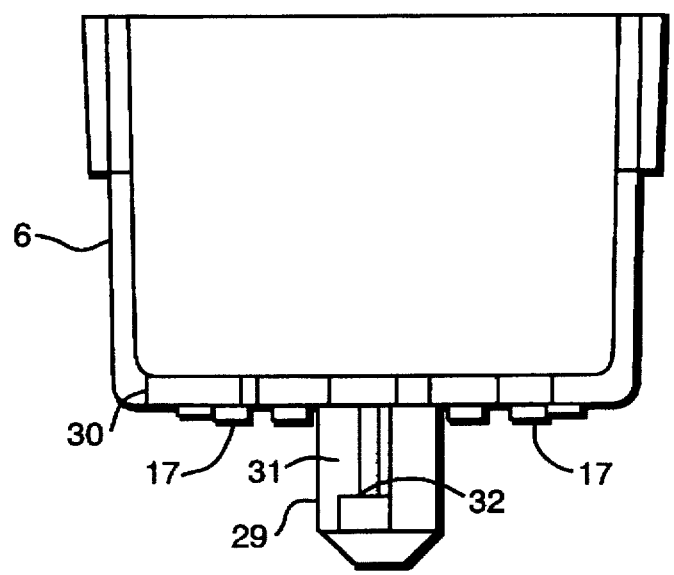
FIG. 3 is a sectional view of a preferred embodiment of a front-removable gage housing according to the present invention.
Figure 5:
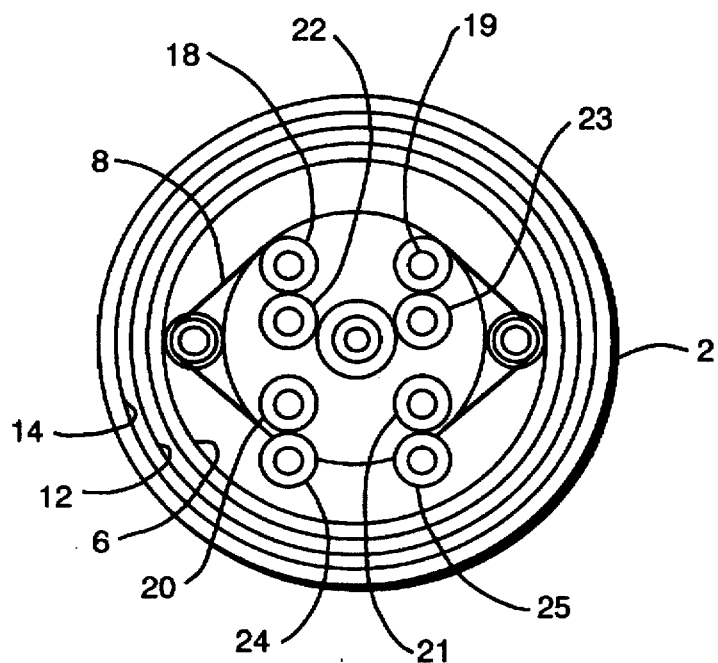
FIG. 5 is a partial top cross-sectional view of a front removable gauge unit according to the present invention showing a center mounted instrument assembly.
Figure 6:
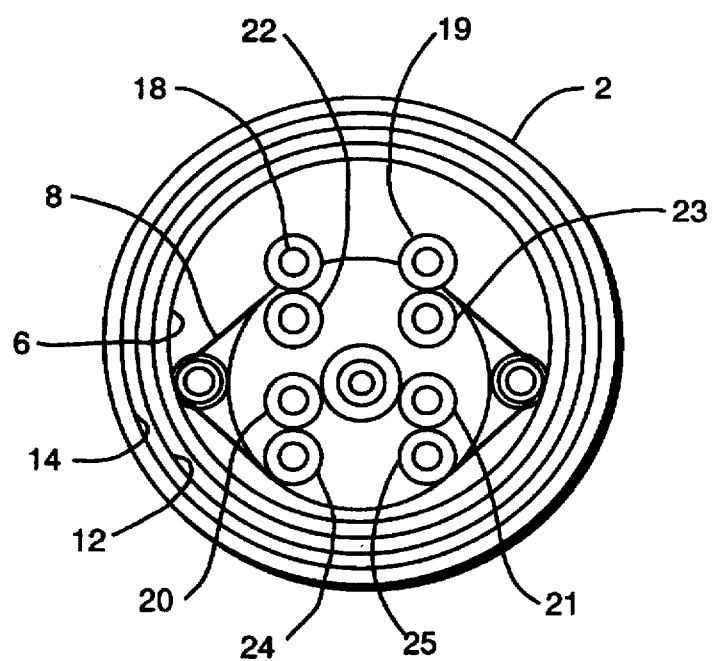
FIG. 6 is a partial top cross-sectional view of a front removable gauge unit according to the present invention showing an off-center mounted instrument assembly.

A group of four metal contacts, the contact 17 in FIG. 3 being typical, are mounted in the bottom wall of the FRG unit 6. These may be located as seen at 18, 19, 20 and 21 of FIG. 5 for center mounting of the air-core 8 or, for below-center mounting as seen at 22, 23, 24, and 25 in FIG. 6. Center mounting of the air core 8 is suitable for gauges requiring a 255 degree pointer sweep and below-center mounting serves best for gauges requiring a 90 degree pointer sweep.

The FRG unit 6 has an integrally molded downwardly extending stud 29 having an end key which passes through a suitable opening in the printed circuit board 4. A shoulder 32 is formed on the stud key 29 and clockwise rotation of the unit 6 locks the shoulder 32 beneath the board 4, tightly joining the FRG unit 6 to the printed circuit board 4. Counterclockwise rotation of the FRG unit unlocks it from the board 4.

In addition to the physical locking of the FRG unit 6 to the board 4 during rotation, the spring metal wipers 5 fixed to the contacts mounted in the bottom of the unit 6 press against arcuate tin-lead pads formed on the upper surface of the board 4 which are thus cleared of oxidation by the wiping action. Reliability of electrical contact between the FRG unit 6 and the printed circuit board 4 is thus enhanced.

Depending on the application in which it is to be used, the FRG unit may lock to a printed circuit board in a case gauge housing or in an instrument cluster housing. Locking of the FRG unit to the printed circuit board gives the entire assembly additional rigidity and protection from shock and vibration encountered in automotive applications. In addition, the ability to lock the FRG unit 6 in this manner permits placement of any gauge in any location in a dash panel.

In addition to their function of making good electrical contact between the printed circuit board 4 and the air core 8 in the instrument assembly, the metal wipers fixed to the contacts 17 at the bottom 30 of the FRG unit 6 have a further purpose. Because they are compressed to a degree when the FRG unit 6 is locked to the printed circuit board, spring action of the U-shaped wipers 5 helps in extracting the FRG unit from the case gauge housing 2 by exerting a slight upward force on the FRG unit.

Figure 4:
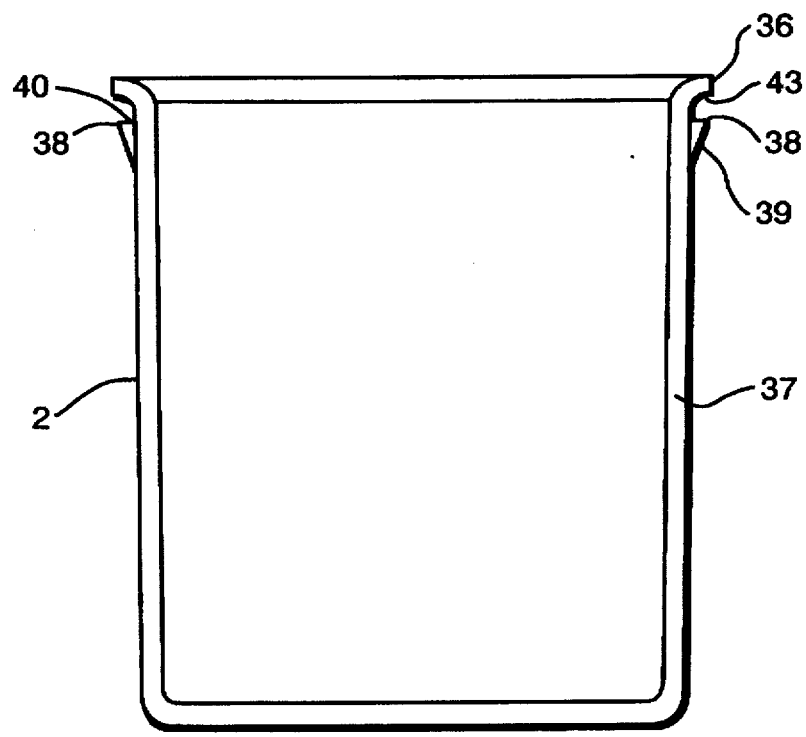
FIG. 4 is a sectional view of a preferred embodiment of a case gauge housing according to the present invention.

In FIGS. 1 and 4, it may be seen that the entire gauge assembly 1 may be locked to a dash panel 15 by means of a locking rim 36 which extends radially from the top of the case gauge housing, and locking tabs 38 which also protrude from the outer surface of the case gauge housing 2 at points spaced axially from the rim 36. The dash panel has a circular opening 45 in which the assembly 1 may be placed. The assembly is compressed to pass the locking tabs 38 to a point beneath the bottom 42 of the panel 15. The spacing of the locking tabs 38 from the locking rim 36 allows for the capture of a conventional 0.060 inch thick dash panel 15 between the tabs and rim when the compressed assembly expands.

Thus, the entire assembly may be mounted to a dash panel without the use of a bracket as is necessary in prior art case gauge designs. Only a round hole in the panel with a small keyway to prevent rotation is required for locking. The case gauge design can also accommodate a mechanical movement instead of the electrical air-core meter movement. For example, a Bourdon tube mechanism or other mechanical movement may be substituted without difficulty. The extension 2a on the case gauge housing 2 may actually be a Packard Electric connector shell into which a plug 27 from an automotive harness 28 may be plugged.

The instrument assembly 7 may be mounted within the FRG unit by fixing the air core 8 in either a center mount or below center mount according to the particular application and desired pointer sweep required, as noted above with reference to FIGS. 3, 5 and 6. The FRG unit is then inserted into the case gauge housing and rotated clockwise to capture the shoulder protrusion 32 on the connector stud key beneath the printed circuit board 4. Thus, according to the present invention there is provided a front removable gauge assembly including an FRG unit and a case gauge housing. The assembly may be mounted to a dash panel as a stand-alone case gauge or may be integrated into an instrument cluster. The front removable technology makes the assembly accessible from the front of a dash panel without any special tools and without need to remove the dash panel. Accordingly, the assembly makes service or replacement of the gauge easy with little labor required. Interchangeability in the configuration of an automotive dash panel to place a gauge in any location is also made possible. A gauge can be removed from a dash panel and replaced with a new gauge in a matter of less than two minutes.

The embodiments which have been described herein, however, are but some of the several which utilize this invention and are set forth here by way of illustration but not of limitation. It is obvious that many other embodiments which will be readily apparent to those skilled in the art may be made without departing materially from the spirit and scope of this invention as defined in the claims.

What is claimed is:

1. A front removable gauge assembly comprising a case gauge housing, a printed circuit board mounted in said housing and having conductive elements electrically connected to an external signal source, said printed circuit board having a central opening formed therethrough, a front removable gauge unit having a bottom wall and electrical contacts passing through said bottom wall, and an integral projection extending centrally from said bottom wall, an end key having a shoulder being formed on said projection, said gauge unit being insertable in said housing with said key penetrating said central opening and said shoulder engaging said bottom wall of said printed circuit board in locking relationship upon rotation of said unit in said case gauge housing, an instrument assembly disposed in said front removable gauge unit, said instrument assembly including a meter movement and means for electrically connecting said meter movement to alternative sets of said electrical contacts inside said bottom wall, whereby said meter movement may be disposed in alternative positions in said gauge unit, spring wiper members disposed on said contacts on the outside of said bottom wall, said spring wiper members contacting said conductive elements of said printed circuit board.

2. A front removable gauge assembly as defined in claim 1, wherein said spring wiper members are compressed upon rotation and locking of said unit to said printed circuit board in said case gauge housing and expand to exert separating force between said unit and said case gauge housing upon reverse rotation of said unit in said case gauge housing.

3. A front removable gauge assembly comprising a cylindrical case gauge housing having an open top, a locking rim formed at said top, locking tabs disposed at a predetermined distance beneath said locking rim, a flat panel having a circular opening to permit insertion of said case gauge housing, said panel being of a thickness less than said predetermined distance, whereby said panel may be captured between said locking rim and said tabs, a printed circuit board mounted within said case gauge housing and having arcuate conductive elements formed on an upper surface thereof, conductors electrically connected to said conductive elements passing through the bottom of said case gauge housing for connection to an external signal source, a cylindrical front removable gauge unit having a bottom wall, an instrument assembly contained in said unit, electrical contacts disposed in the bottom wall of said unit electrically connected to said instrument assembly within said unit, and spring wiper members mounted on said contacts disposed in the bottom wall of said unit, whereby insertion and rotation of said unit in said case gauge housing causes said wiper members to wipe the surfaces of said arcuate conductive elements on said printed circuit board to provide improved electrical conduction therebetween.

4. A front removable gauge assembly as defined in claim 3 and further including an integral projection formed centrally on the bottom wall of said unit, said printed circuit board having a central opening formed therethrough, said integral projection terminating in a locking key for engaging said printed circuit board upon said insertion and rotation of said unit in said case gauge housing.

* * * * *